United States Patent
Mae (10) Patent No.: US 7,555,198 B2
(45) Date of Patent: Jun. 30, 2009

(54) RECORDING DEVICE, RECORDING MEDIUM RECORDING METHOD, AND PROGRAM FOR RECORDING MEDIUM RECORDING METHOD

(75) Inventor: Atsushi Mae, Tokyo (JP)

(73) Assignee: Sony Corporation, Tokyo (JP)

( * ) Notice: Subject to any disclaimer, the term of this patent is extended or adjusted under 35 U.S.C. 154(b) by 655 days.

(21) Appl. No.: 10/539,154

(22) PCT Filed: Nov. 19, 2003

(86) PCT No.: PCT/JP03/14699

§ 371 (c)(1),
(2), (4) Date: Jun. 16, 2005

(87) PCT Pub. No.: WO2004/057606

PCT Pub. Date: Jul. 8, 2004

(65) Prior Publication Data

US 2006/0133246 A1 Jun. 22, 2006

(30) Foreign Application Priority Data

Dec. 19, 2002 (JP) .............................. 2002-367749

(51) Int. Cl.
*H04N 5/91* (2006.01)
(52) U.S. Cl. ......................................... 386/83; 386/95
(58) Field of Classification Search .................. 386/95, 386/98, 83
See application file for complete search history.

(56) References Cited

U.S. PATENT DOCUMENTS

| 5,479,351 | A | | 12/1995 | Woo et al. | |
|---|---|---|---|---|---|
| 5,852,528 | A | * | 12/1998 | Kori et al. | ..................... 360/69 |
| 2003/0152369 | A1 | * | 8/2003 | Isobe et al. | ................... 386/95 |

FOREIGN PATENT DOCUMENTS

| EP | 1 187 476 | 3/2002 |
|---|---|---|
| JP | 5-165935 | 7/1993 |
| JP | 7-65548 | 3/1995 |
| JP | 7-111630 | 4/1995 |
| JP | 9-198843 | 7/1997 |
| JP | 11-17908 | 1/1999 |

* cited by examiner

*Primary Examiner*—Thai Tran
*Assistant Examiner*—Hung Q Dang
(74) *Attorney, Agent, or Firm*—Frommer Lawrence & Haug LLP; William S. Frommer; Ellen Marcie Emas (57) ABSTRACT

A video camera uses an optical disk based on the DVD system. Data for determination changing each time data corresponding to a recording unit from a start of a recording operation until the end of the recording operation is generated based on management data recorded in a recording medium and is recoded in the recording medium 5. A type of a recording apparatus having recorded a recording unit recorded last is determined by comparing the data for determination recorded in the recording medium 5 to the management data, thereby switching a management unit.

9 Claims, 7 Drawing Sheets

RECORDING DEVICE, RECORDING MEDIUM RECORDING METHOD, AND PROGRAM FOR RECORDING MEDIUM RECORDING METHOD

TECHNICAL FIELD

The present invention relates to a recording apparatus, a method of recording data in a recording medium, and a program for the method of recording data in a recording medium. The invention can be applied, for instance, to a video camera using an optical disk based on the DVD (Digital Versatile Disk) system. The present invention enables secure management of recorded contents, even when data is additionally recorded in a recording medium recorded with a device having a different management unit, by generating data for determination changing each time a recording unit from start of recording until end of recording is recorded in a recording medium based on management data recorded in the recording medium and recording the data in the recording medium, comparing the data for determination recorded in the recording medium to the management data, and determining based on a result of the comparison a recording apparatus employing the recording unit for data recorded last to switch the management unit.

BACKGROUND ART

Heretofore, in a DVD recorder which is a stationary device for home use, data recorded from a start until the end of a recording operation is managed as one program according to the video recording format for a DVD.

Recently, there has been proposed and developed a portable type of video camera in which an optical disk based on the DVD system is used as a recording medium.

For the optical disk based on the DVD system, there have been proposed various types of file management systems as disclosed, for instance, in Japanese Patent Laid-Open No. 2001-111944.

In this portable type of video camera, it is generally anticipated that operations for starting and stopping recording are frequently repeated. However, in an optical disk based on the DVD system, the maximum number of allowable programs is limited to 99. With this scheme, in the portable type of video camera, it is conceivable that a plurality of scenes intermittently recorded are compiled into one program based on such data as a date suited to batch management.

With this scheme, however, when data recorded with this type of video camera is additionally recorded in an optical disk based on the DVD system storing therein data recorded with a DVD recorder, for instance, a TV program recorded at home and various scenes recorded at remote sites are compiled into one program for management, which disadvantageously and remarkably degrades the convenience in practical use.

DISCLOSURE OF INVENTION

The present invention was made in the light of the circumstances as described above, and proposes a recording apparatus and a recording method for a recording medium enabling secure management of recorded contents even when additional data is recorded in a recording medium storing therein data recorded with a device having a different management unit, and a program for the recording method for a recording medium.

To solve the problem as described above, in the present invention, management data is generated so that a system stream, in which an audio stream and a video stream are multiplexed, can be managed as one recording unit from a recording start to a recording end corresponding to the recording start and also said plurality of recording units can be managed as another management unit; the system stream and management data are applied to a recording apparatus for recording data in a recording medium to generate data for determination changing each time data corresponding to said recording unit is recorded in the recording medium based on the management data; the data for determination is recorded in the recording medium; the data for determination recorded in the recording medium is compared to the management data to determine a recording apparatus having the recording unit for data recorded last; and a management unit is switched according to a result of said determination.

When the configuration according to the present invention as described above is applied to a recording apparatus, by generating data for determination changing each time data corresponding to a recording unit is recorded in a recording medium, recording the data for determination in the recording medium, comparing the data for determination recorded in the recording medium to the management data to determine a recording apparatus having the recording unit for data recorded last, and switching a recording unit based on a result of the determination, it is possible to easily determine the recording apparatus having the recording unit for data recorded last, and also by updating the management unit based on the determination result, even when additional data is recorded in a recording medium storing therein data recorded with a device having a different management unit, the recorded contents can accurately be switched.

In the present invention, management data is generated so that a system stream, in which an audio stream and a video stream are multiplexed, can be managed with data recorded from a start to the end of a recording operation as one recording unit and also with data corresponding to a plurality of recording units as another management unit; the system stream and management data are applied to a recording method for a recording apparatus for recording data in a recording medium to generate data for determination changing each time data corresponding to a recording unit is recorded in the recording medium based on the management data; the data for determination is recorded in the recording medium; the data for determination recorded in the recording medium is compared to the management data to determine a recording apparatus having the recording unit for data recorded last; and a management unit is switched according to a result of determination.

Because of the features as described above, with the configuration according to the present invention, it is possible to provide a recording method for a recording medium enabling secure management of recorded data even when data is additionally recorded in a recording medium recorded with a device having a different management unit.

Further in the present invention, a program for the recording method for a recording medium according to the present invention is applied to a computer controlling operations of a recording apparatus to make the computer executed a pre-specified processing sequence, and the recording method includes the steps of generating data for determination changing each time data corresponding to a recording unit is recorded in a recording medium based on management data and recording the data for determination in the recording medium, comparing the data for determination recorded in the recording medium to the management data to determine a recording apparatus employing the recording unit for data recorded last, and switching a management unit according to the determination result.

Because of the features as described above, it is possible to provide a program for a recording method for a recording medium enabling secure management of recorded contents even when data is additionally recorded in a recording medium recorded with a device having a different management unit.

BEST MODE FOR CARRYING OUT THE INVENTION

An embodiment of the present invention is described in detail with reference to related drawings.

(1) Configuration of the Embodiment

Figure 1:
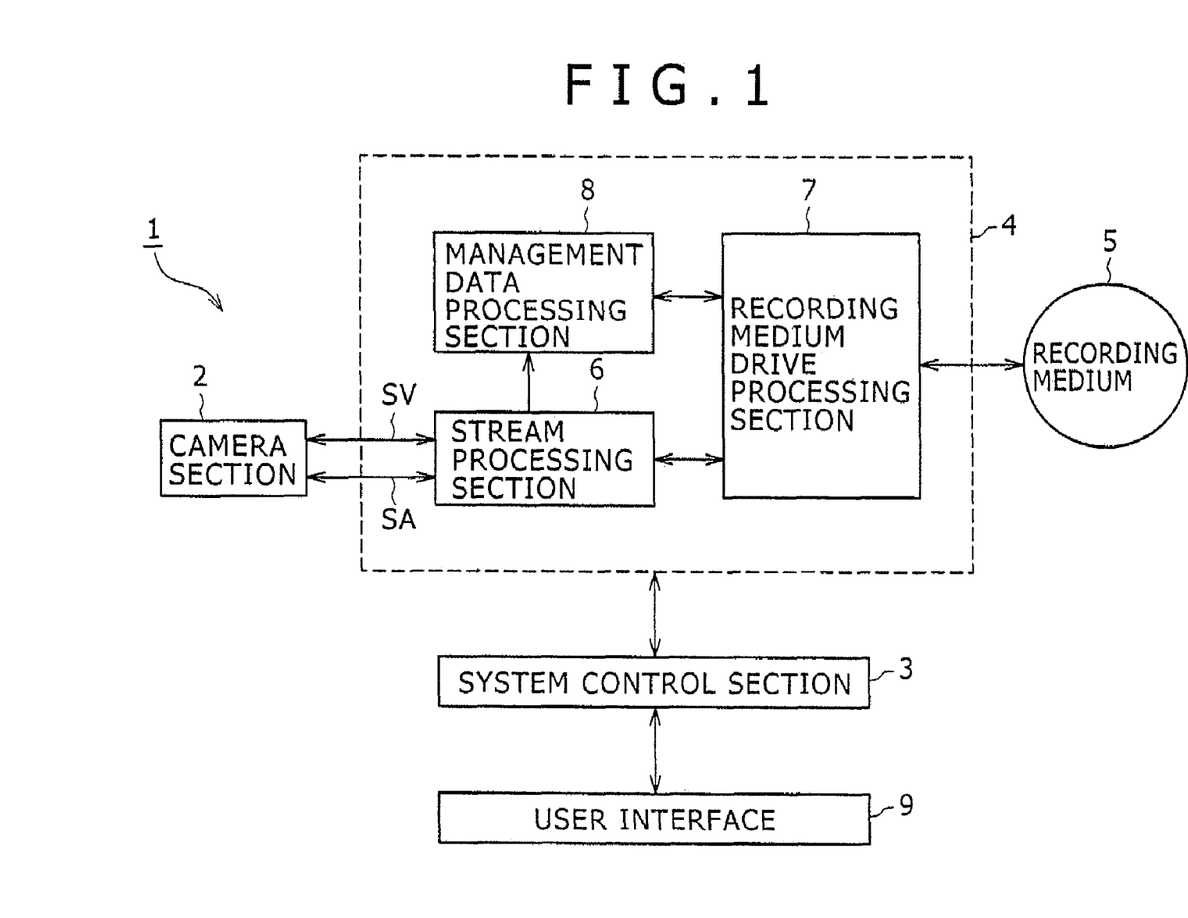
FIG. 1 is a block diagram showing a video camera according to one embodiment of the present invention.

FIG. 1 is a block diagram showing a portable type video camera using an optical disk based on the DVD system according to the embodiment of the present invention. In this video camera 1, a camera section 2 switches operations thereof under control by a system control section 3, outputs a video stream SV and an audio data stream SA fetched from an object to a deck section 4, and further fetches the video stream SV and the audio stream SA reproduced in the deck section 4 for monitoring.

The deck section 4 switches operations thereof under control by the system control section 3, records the video stream SV and audio stream SA in a recording medium 5, and also reproduces the video stream SV and audio stream SA from the recording medium 5 for outputting the data to the camera section 2. In this embodiment, an optical disk based on the DVD system is used as the recording medium 5.

In the deck section 4, a stream processing section 6 switches operations thereof under control by the system control section 3 and, when recording data, generates a system stream by multiplexing the video stream SV and audio stream SA outputted from the camera section 2, and also outputs this system stream to a recording medium drive processing section 7. Further the stream processing section 6 outputs various types of information required for generation of management data for managing the recording medium 5 to a management data processing section 8. On the contrary, when data is to be reproduced, the stream processing section 6 divides the system stream outputted from the recording medium drive processing section 7 to the video stream SV and audio stream SA, and outputs the streams to the camera section 2.

The management data processing section 8 generates, when recording data, management data based on information outputted from the stream processing section 6 as well as data outputted from the system control section 3, and outputs the management data to the recording medium drive processing section 7. When reproducing the data, the management data processing section 8 processes the management data outputted from the recording medium drive processing section 7 and reports the management data to the system control section 3 and other related sections.

The recording medium drive processing section 7 switches operations thereof under control by the system control section 3, processes the system stream outputted from the stream processing section 6 and management data outputted from the management data processing section 8 to satisfy the requirements for an optical disk based on the DVD system, and stores the system stream and management data in the recording medium. In reproduction, the recording medium drive processing section 7 reproduces data from the recording medium 5 and outputs the data to the stream processing section 6 and management data processing section 8.

A user interface 9 detects operations of operators or the like provided in this video camera, reports the operations to the system control section 3, and also reports various types of alarms and the like outputted from the system control section 3 to the user.

The system control section 3 is a computer, and controls operations of the video camera 1 as a whole by executing a program recorded in an incorporated memory in response to operations of the operators or the like by the user reported from the user interface 9. Namely, when a recording start button is pressed by the user, the system control section 3 coordinates and controls operations of the entire video camera 1 by issuing a recording demand from the user interface 9, and then generates a system stream in the stream processing section 6 based on the video stream SV and audio stream SA obtained by the camera section 2, further generates corresponding management data in the management data processing section 8, and records the management data with the recording medium drive processing section 7 in the recording medium 5. Further when recording is started as described above and then a recording end button is pressed by the user, the system control section 3 terminates recording by coordinating and controlling operations of the entire video camera 1 based on a recording stop demand from the user interface 9.

Figure 2:
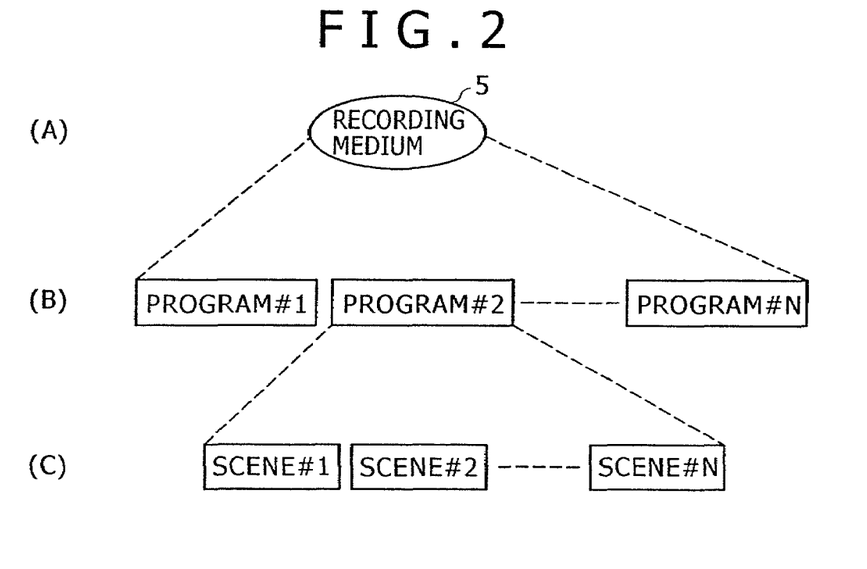
FIG. 2 is a schematic diagram for illustrating management of scenes with the video camera shown in FIG. 1.

In this embodiment, a recording unit (i.e. recorded unit) from a start of a recording operation until the end of this recording operation as described above is defined as a scene. In the video camera 1, a plurality of scenes in a range suited for management by a user are managed as a management unit by a program as shown in FIG. 2, and the range managed by the program as a management unit is set for a recording date. Because of this feature, when data is additionally stored in the recording medium 5, if a scene recorded just ahead has the same date as that provided by an incorporated timer, the additional data is managed by the same program as that for the scene already recorded.

When the management by a program dealing data having the same date as a management unit, in this embodiment, even if there are a plurality of data streams having the same date, a scene recorded by other device is managed by a different program, so that, for instance, a TV program recorded at home and various scenes recorded at remote sites are prevented from being managed by the same program, which insures improvement in convenience for users in practical use.

In the management of scenes by the program as described above, the management is carried out based on the management data generated in the management data processing section 8.

Figure 3:
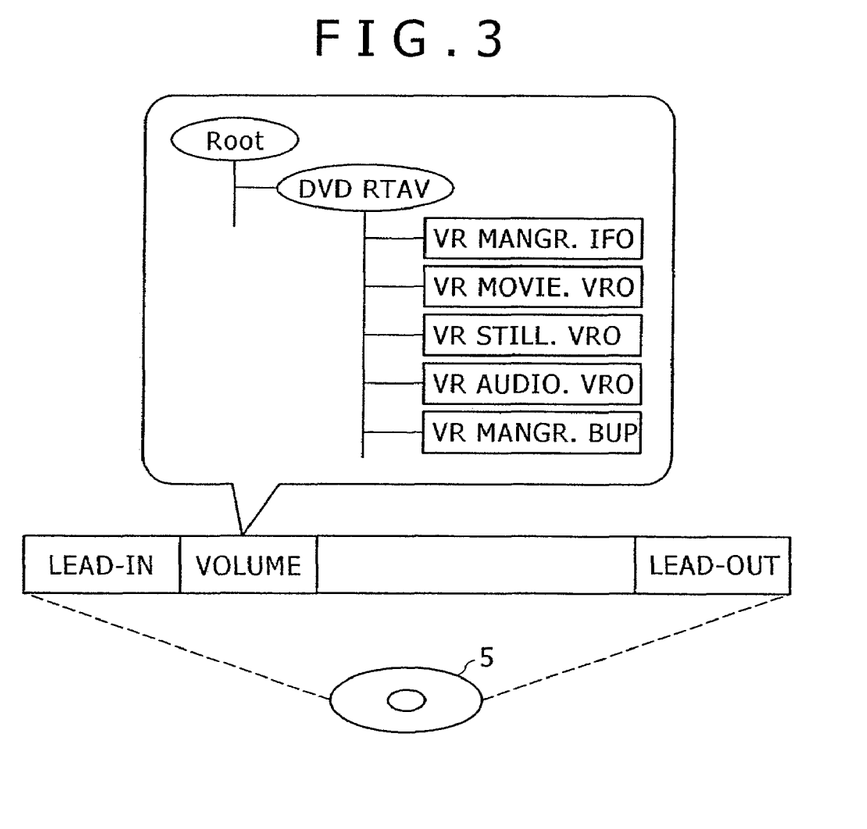
FIG. 3 is a schematic diagram showing a formant of a recording medium for the video camera shown in FIG. 1.

FIG. 3 is a schematic diagram showing logical configuration of the recording medium 5 providing management of the management data as described above. In the recording medium 5, a management file VR_MANGR.IFO and the like controlled based on the management data is provided in a DVD_RTAV directory just below a ROOT directory. In this directory, the VR_MOVIE.VRO file is a file in which a moving picture is recorded, while the VR_STILL.VRO file is a file in which a still picture and audio data simultaneously recorded together with the still picture are recorded. The VR_AUDIO.VRO file is a file in which only audio data is recorded, and the VR_MANGR.BUP is a backup file for the management file VR_MANGR.IFO.

In this embodiment, video data and video data each constituting a system stream described above is sequentially divided with a prespecified data volume to form video packs and audio packs, and M_VOBs including VOBUs (Video Object Unit) each having the video packs and audio packs are arranged according to the recording order to form the VR_MOVIE.VRO file.

In this embodiment, the M_VOB including the system stream as described above constitutes a scene as a recording unit, and a header position of the M_VOB is identified by an entry point assigned to the management file VR_MOVIE.IFO file. Further as shown in FIG. 4, a plurality of scenes are managed by a program by means of management of a reproduction path based on the program chain information (PGCI).

In the DVD system, the reproduction path is defined by a sequence of cells (PGC: Program Chain) each indicating a partial zone or the entire zone of the M_VOB file. This reproduction path includes an original PGC (Program Chain) referring to all video data in a disk and a user-definable PGC allowing a definition by a user. In the original PGC, a program formed by logically bundling a plurality of cells is defined, and a plurality of M_VOBs (VOBs) in the VR_MOVIE.VRO file are managed by this program.

Figure 4:
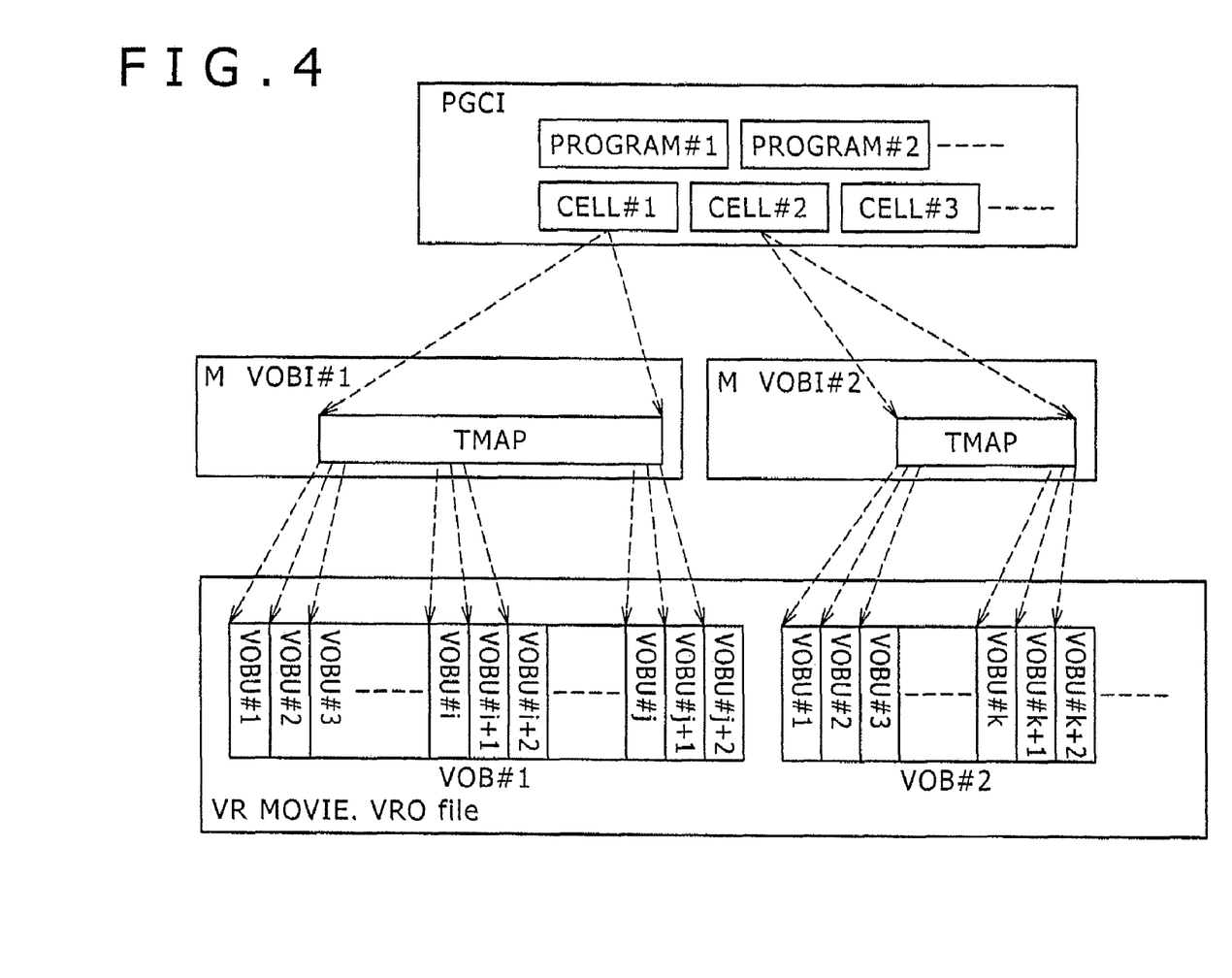
FIG. 4 is a diagram for illustrating a PGC.

In FIG. 4, the M_VOBI is management data provided in each M_VOB, and TMAP is a filter for converting time information based on the program chain information in the M_VOBI to the VOB address.

Figure 5:
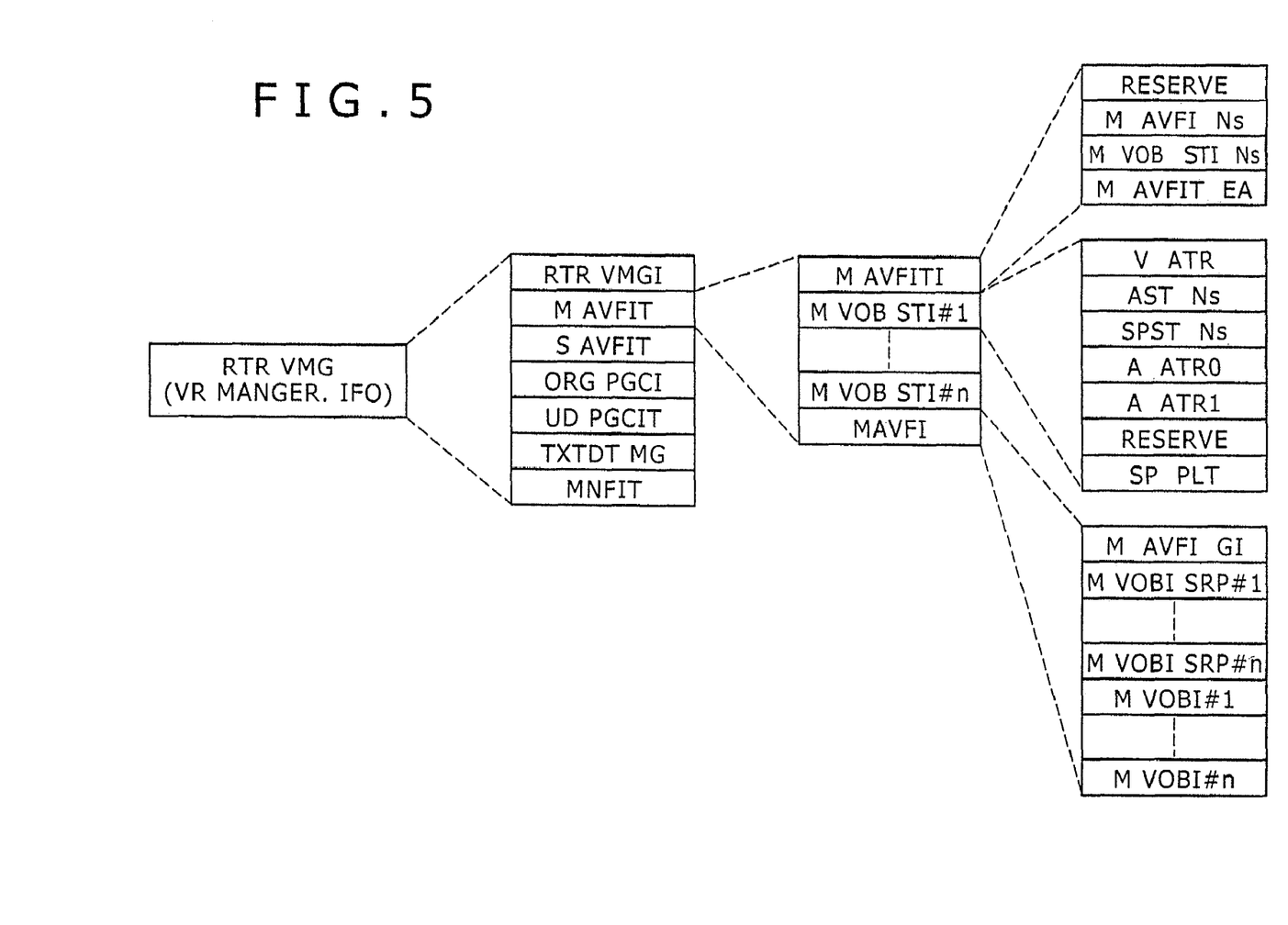
FIG. 5 is a diagram for illustrating a management data file.

FIG. 5 is a diagram showing a management file VR_MANGR.IFO put under the control as described above. Information for real time recording video management (RTR_VMG) is assigned to the management file VR_MANGR.IFO, and this RTR_VMG includes the following 7 tables: RTR_VMGI, M_AVFIT, S_AVFIT, ORG_PGCI, UD_PGCIT, TXTDT_MG, and MNFIT.

Information concerning a disk as a whole such as an identifier indicating the management file VR_MANGR.IFO and recording position information are herein assigned to RTR_VMGI. Namely, start addresses (M_AVFIT_SA) for M_AVFIT and S_AVFIT, a start address and an end address for ORG_PGCI, and start addresses (MNFIT_SA) for UD_PGCIT, TXTDT_MG, and MNFIT are assigned to the RTR_VMGI. With this configuration, in this recording medium 5, each of successive tables can be searched based on the RTR_VMGI of the management file VR_MANGR.IFO.

Management information corresponding to the moving picture AV file VR_MOVIE.VRO is assigned to the M_AVFIT, and management information corresponding to the still picture AV file VR_STILL.VRO is assigned to the S_AVFIT. Management information corresponding to the original PGC is assigned to the ORG_PGCI, while management information corresponding to the user-definable PGC is assigned to the UD_PGCIT. Management information for management of text data is assigned to the TXTDT_MG, and the MNFIT is assigned to a user area.

Of these, the M_AVFIT includes M_AVFITI, M_VOB_STI, and M_AVFI. Of these, the M_AVFITI stores therein information required to access the following M_VOB_STI and M_AVFI. More specifically, information indicating whether the moving AV file VR_MOVIE.VRO is present or not (M_AVFI_Ns), information M_VOB_STI_Ns indicating a number of following M_VOB_STIs, and an end address (M_AVFIT_EA) for M_AVFITI are recorded in the M_AVFITI.

In contrast, M_VOB_STI is provided for each M_VOB, and information concerning configuration of VOB is recorded in the M_VOB_STI. More specifically, video attribute information (V_ATR) for the corresponding M_VOB, a number of audio streams (AST_Ns), a number of sub-picture streams (SPST_Ns), audio attribute information corresponding to the audio stream 0 (A_ATR0), audio attribute information corresponding to the audio stream 1 (A_ATR1), and color pallet information for a sub-picture (SP_PLT) are successively assigned to the M_VOB_STI.

Information required to access the M_VOB is assigned to the M_AVFI, and the M_AVFI includes M_AVFI_GI, M_VOBI_SRP, and M_VOBI.

Figure 6:
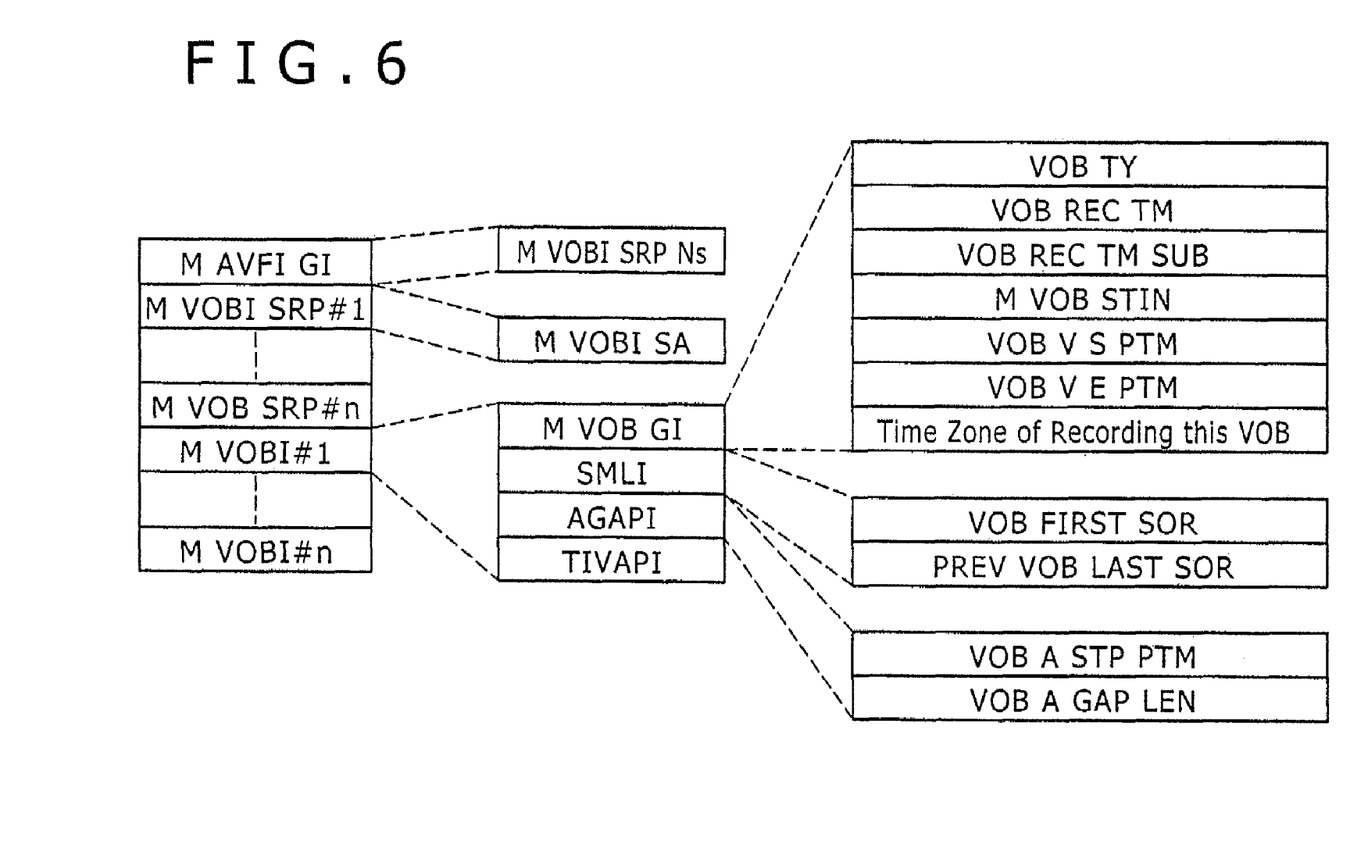
FIG. 6 is a diagram for illustrating M_AVFI in the management data file shown in FIG. 5.

As shown in FIG. 6, a number of search pointers set in all of M_VOBs (M_VOBI_SRP_Ns) are assigned to the M_AVFI_GI. The successive M_VOBI_SRP are provided for each M_VOBs, and a start address M_VOBI_SA for management data M_VOBI for the corresponding M_VOB is assigned to each M_VOB.

The M_VOBI is provided for each M_VOB, and includes M_VOB_GI, SMLI, AGAPI, and TMAPI. Assigned to the M_VOB_GI are information (VOB_TY) indicating whether or not originals, rewritten ones and gaps are present in the audio steams 0 and 1 of corresponding M_VOB, information (VOB_REC_TM) and (VOB_REC_TM_SUB) indicating a date and time when recording of the corresponding M_VOB is started. Data concerning the date and time when recording is started indicated by the VOB_REC_TM is formed with data for year, month, day, time of a day, minute, and second. A field is assigned to the data concerning the date and time when recording is started indicated by the VOB_REC_TM_SUB.

Further a number (M_VOB_STIN) identifying the M_VOB_STI relating to the corresponding M_VOB is assigned to the M_VOB_GI. Further, information concerning a time zone relating to this M_VOB (Time_Zone_of_Recording_this_VOB) is recorded therein in correspondence to the time information (VOB_V_S_PTM) for a start of display of the corresponding M_VOB, time information (VOB_V_E_PTM) for the end of display, and information of the time zone assigned to the RTR_VMG.

Because of this configuration, in the recording medium 5, start time of recording can be detected for each M_VOB from the VOB_REC_TM and VOB_REC_TM_SUB. Further, end time of recording can be detected from the start time of recording as well as from the VOB_V_S_PTM and VOB_V_E_PTM.

Assigned to the SMLI is information required for seamless reproduction with the VOB just ahead. Namely SCR (System Clock Reference) for a head pack of the corresponding VOB (VOB_FIRST_SCR) and SCR for the last pack of the corresponding VOB (PREV_VOB_LAST_SCR) are assigned to the SMLI. The SCR is information indicating a time of a day when data for the corresponding pack is inputted into a decoder buffer.

Information required for processing an audio reproduction gap with a decoder is assigned to the AGAPI. Assigned to the AGAPI are information (VOB_A_STP_PTM) concerning a time of a day for forming a gap, namely a time of a day for temporally stopping reproduction of audio data, and information (VOB_A_GAP_LEN) concerning a period of time for temporally stopping reproduction of the audio data. Information concerning an access point for each of TMUs with a prespecified time interval therebetween is assigned to the TMAPI.

Figure 7:
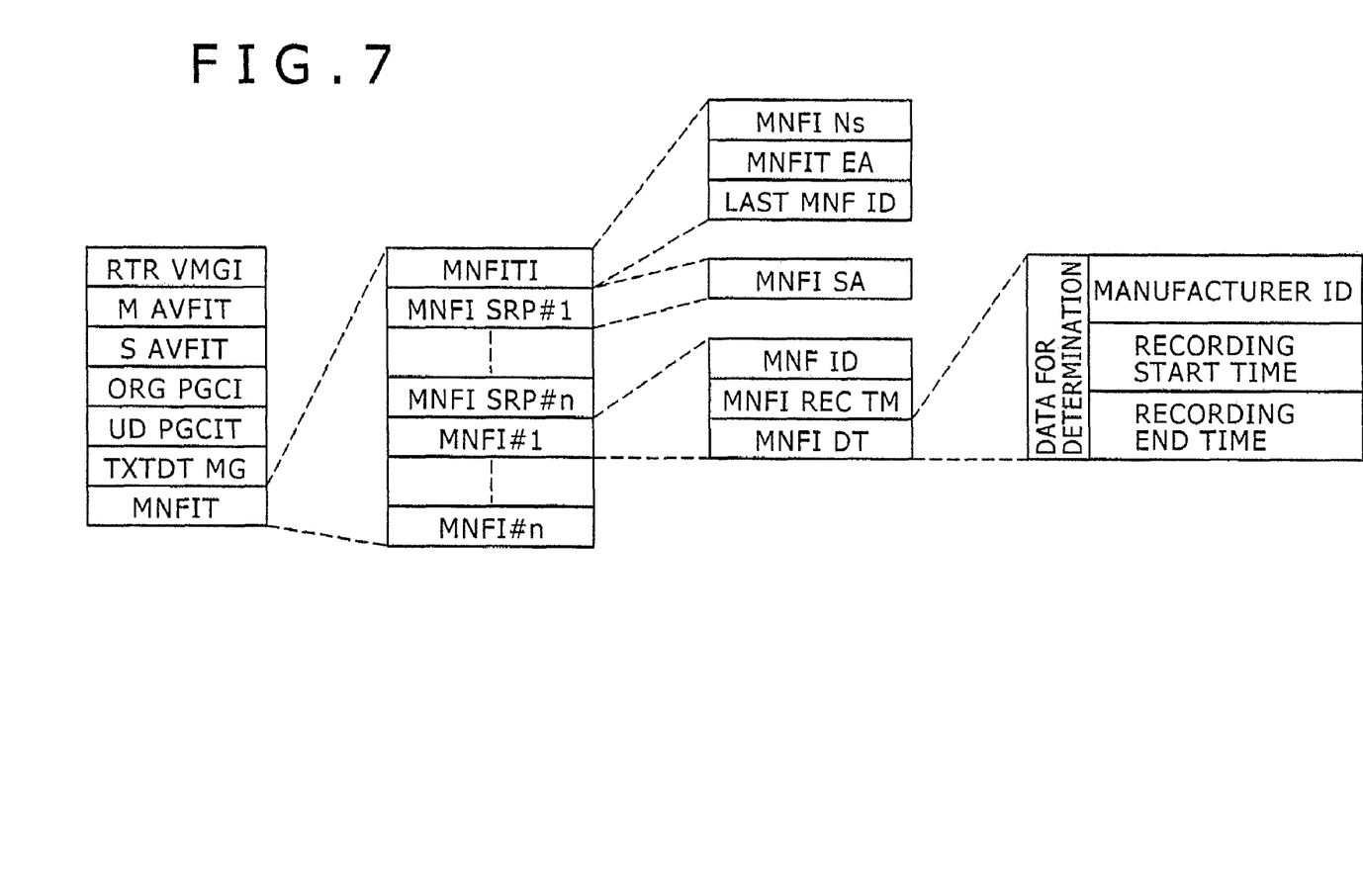
FIG. 7 is a diagram for illustrating MNFIT in the management data file shown in FIG. 5.

FIG. 7 is a diagram showing the MNFIT. The MNFIT includes MNFITI, MNFI_SRP, and MNFI. Of these, the MNFITI is management information for MNFIT, and includes a number of successive MNFIs (MNFI_Ns), an end address of the successive MNFI (MNFIT_EA), and an ID of the last MNFI (LAST_MNF ID). The MNFITI is provided for each MNFI, and a start address of the corresponding MNFI is assigned to the MNFITI. Up to five MNFIs can be provided. The MNFI includes a manufacture ID (MNF_ID) including an ID of a recording device or the like, recording time information for this MNFI (MNFI_REC_TM), and a domain (MNFI_DT) which a user can use freely.

In this video camera 1, data for determination changing each time the M_VOB as a recording unit is recorded in the recording medium 5 is generated according to the management data based on the M_AVFIT described above. The data for determination is assigned to this domain (MNFI_DT) and is recorded in the recording medium 5. In this embodiment, the manufacture ID, recording start time which is time information for the recording unit recorded last, and recording end time are assigned to the data for determination.

Namely the system control section 3 and the management data processing section 8 set data recorded from a start of a recording operation until the end of the recording operation in the M_VOB which is one recording unit and records the system stream in the recording medium 5. Further, the system control section 3 and the management data processing section 8 generate and record a file VR_MANGR.IFO based on the management data in the recording medium 5 in correspondence to the record. In this step, when it is determined based on M_AVFIT in the management data having been recorded in the recording medium 5 that the recording start time for the M_VOB relating to the data recorded just ahead has the same date as that of the M_VOB to be recorded anew, the system control section 3 and management data processing section 8 generate management data based on program chain information so that the new M_VOB is managed as the same program as that managing the previously recorded M_VOB. Thus, various types of scenes recorded on the same date are managed by the same program, which insures improvement of convenience in use.

In this processing step, the system control section 3 and management data processing section 8 fetch the recording start time and recording end time relating the M_VOB just recorded from the time information for the corresponding M_VOB described above in relation to the M_AVFIT. Then, the system control section 3 and management data processing section 8 assign the information together with the manufacture ID set in this video camera 1 as data for determination to the user domain MNFI_DT for the management data and record the information in the recording medium 5.

The information concerning the recording start time and recording end time for the M_VOB just recorded is data changing each time the M_VOB as a recording unit is recorded in the recording medium 5, and in the usual DVD recorder, the information is recorded in the user domain MNFI_DT including no record. In contrast, in the M_AVFIT related to the M_VOB, even in the usual DVD recorder, each time the M_VOB is recorded, the corresponding VOB is additionally recorded.

With this configuration, by comparing the determination data recorded as described above and obtained from the user domain MNFI_DT to the recording start time and recording end time for the M_VOB recorded last in the recording medium 5, whether or not the VOB is recorded in the recording medium 5 by a device not managing a plurality of recording units as one recording unit in batch by a program can be determined.

Figure 8:
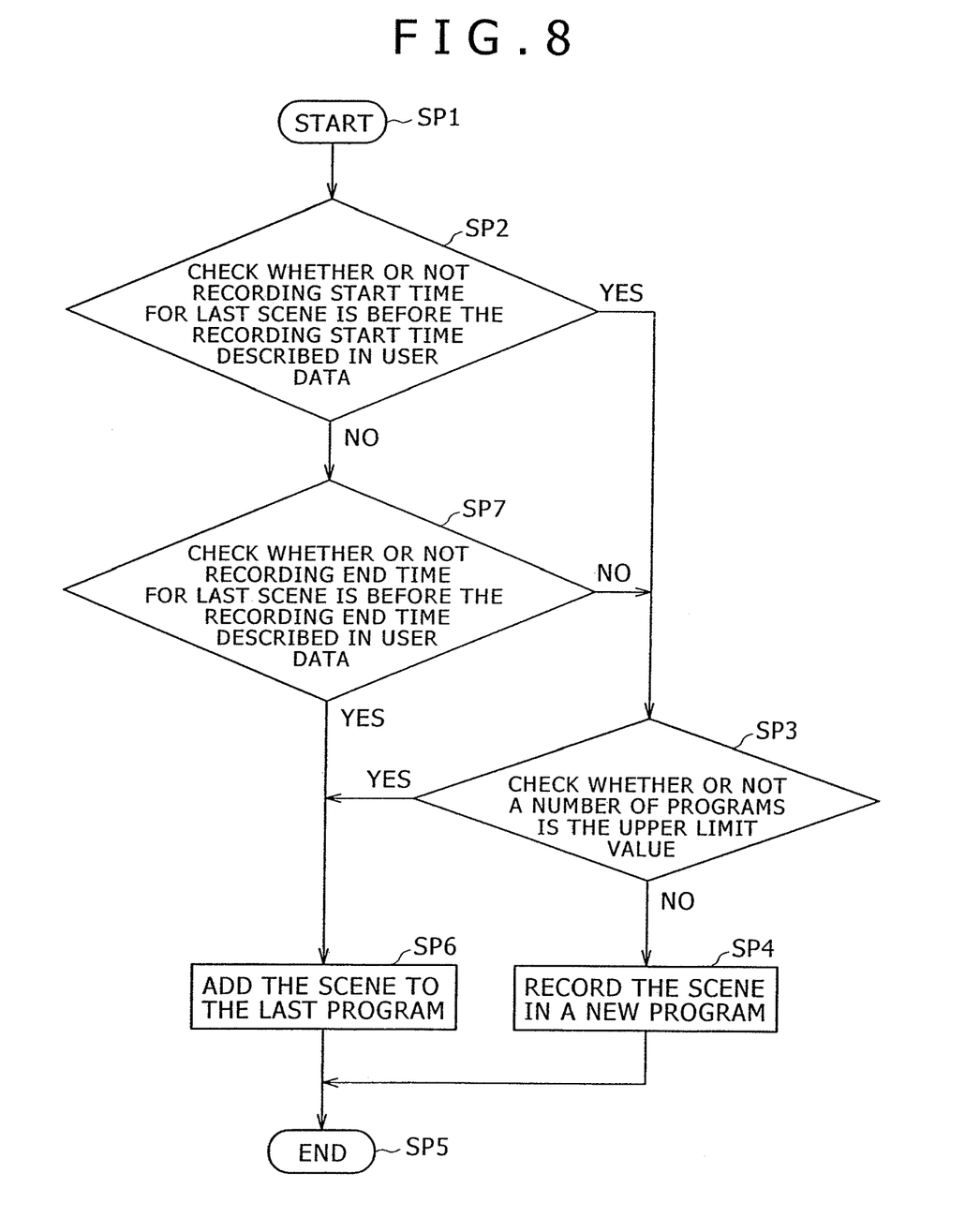
FIG. 8 is a flow diagram showing a processing sequence in a system control section for the video camera shown in FIG. 1.

With the configuration as described above, when recording of a system stream in the recording medium 5 is started, if the scene recorded last in the recording medium 5 relates to the same date as that of a scene to be recorded from now on, the system control section 3 determines a type of the recording device for the M_VOB recorded last in the recording medium 5, and updates the program based on a result of this determination by executing the process shown in FIG. 8.

Namely the system control section 3 advances the processing from step SP1 to step SP2, and determines whether the recording start time for the scene recorded last in the recording medium 5 is before or after the recording start time of a scene reproduced from the user domain. When an affirmative result is obtained, it is determined that this last scene was clearly recorded by a recording device not managing the user domain and managing data recorded from a start of an recording operation until the end of the recording operation as one program such as a DVD recorder, and therefore the system control section 3 advances the processing from step SP2 to step SP 3.

In this step, the system control section 3 determines whether or not a number of programs set in the recording medium 5 is the maximum number allowable to be set in the recording medium 5 or not, namely whether the program can be updated. When an affirmative result is obtained, the system control section 3 advances the processing from step SP3 to step SP4 to control an operation of the entire recording apparatus for recording the scene with a new program, and then the processing proceeds to step SP5 to terminate the processing.

When an affirmative result is obtained in step SP3, on the other hand, it is difficult to update the program even if it is tried, so that the system control section 3 advances the processing from step SP3 to step 6. The system control section 3 sets the management data for managing with a program for the scene recorded just ahead to additionally record the new scene in the recording medium 5, and then the processing proceeds to step SP5 to terminate the processing.

When a negative result is obtained in step SP2, the system control section 3 advances the processing from step SP2 to step SP7. In this step SP7, the system control section 3 determines whether the recording end time for the last scene is before or after the recording end time for the scene reproduced from the user domain. When a negative result is obtained in this step, it is considered that the scene recorded last was clearly recorded with a DVD recorder, and then the system control section 3 advances the processing from step SP7 to step SP3. Depending on a result of a number of programs, the system control section 3 either updates a program or uses the program for the last scene for additionally recording the new scene in the recording medium 5. Then, the processing proceeds to step SP 5 to terminate the processing.

In contrast, when an affirmative result is obtained in step SP7, even if the scene recorded last had partially been deleted owing to editing or the like, it is considered that the scene recorded last was recorded with this video camera 1. Thus, the new scene should additionally be recorded in succession to the last scene to be managed by one program for improving the user's convenience in use. Therefore, the system control section 3 advances the processing from step SP7 to step SP6, records the new scene to the program relating to the last scene, and then the processing proceeds to step SP5 to terminate the processing.

(2) Operations in the Embodiment

With the configuration as described above, in this video camera 1, an audio stream SA and a video stream SV each acquired by the camera section 2 are multiplexed by the stream processing section 6 to generate a system stream, and this system stream is recorded in the recording medium 5 based on the DVD disk system by the recording medium drive processing section 7. Management data for the system stream recorded in the recording medium 5 is generated by the management data processing section 8, and this management data is recorded by the recording medium drive processing section 7 in the recording medium 5.

The audio stream SA and video stream SV are divided by a data volume unit to form a plurality of audio packs and video packs, respectively. The VOBUs each including an audio pack and a video pack succeeding from a start of a recording operation until the end of the recording operation are recorded as one M_VOB. With this configuration, the audio stream SA and video stream SV are set as the M_VOB as a recording unit, and scenes each based on this recording unit are successively recorded in the recording medium 5.

When a plurality of scenes are recorded on the same day, management data is set so that the plurality of scenes can be managed as one program based on the program chain information PGCI, and the scenes are recorded in the recording medium 5.

Because of the configuration, with the video camera 1, for instance, when a user carries the video camera 1 during a travel and records a number of scenes over several days, the plurality of scenes can be managed by referring to the date of each scene, so that the user's convenience in use can be improved.

In the case where a plurality of scenes are added according to a date of each scene and successively recorded in the recording medium 5, there may occurs the situation that the recording medium 5 is used for recording a TV program with a DVD recorder for home use. In this case, in the DVD recorder, the M_VOBs corresponding to data recorded from a start of a recording operation until the end of the recording operation are assigned to one program and recorded in the recording medium 5. Because of this configuration, a plurality of scenes recorded with the video camera and the TV programs recorded by the DVD recorder can be manages as separate programs, so that the user can enjoy a result of recording with the video camera 1 and the TV program recorded with the DVD recorder discretely without suffering the troubles as experienced in the conventional technology.

However, when the recording medium 5 is further removed from the video camera 1 and is used for recording additional scenes on the same day as that when the TV program is recorded, if there is no contrivance to respond to the situation as described above in the video camera 1, management data is recorded so that the additionally recorded scenes are managed by the program managing the TV program. Namely in this case, the TV program is reproduced and the additionally recorded scenes such as a landscape are recorded in succession to the end of the TV program.

To avoid the troubles as described above, data for determination changing each time one M_VOB as a recording unit is recorded in the recording medium 5, and the data for determination is recorded in a user domain for the management data not managed by the DVD recorder. Further, when a new scene is recorded, a type of the recording device having recorded the scene recorded last in the recording medium 5 is determined, and a program is updated based on a result of this determination.

In other words, when the data for determination recorded in the user domain as described above is different from the data for determination generated anew based on the management data, it is considered that the M_VOB was recorded with a DVD recorder, and it can be considered that the recording device recorded the scene recorded last in the recording medium 5 is a DVD recorder. In contrast, when the data for determination recorded in the user domain is identical to the data for determination generated anew based on the management data, it can be considered that the recording device having recorded the scene recorded last in the recording medium 5 is a device managing a plurality of scenes by referring to a date of each scene with one program like the video camera 1.

With the configuration, when a program used for recording a new scene is switched, a TV program and the new scene as described above are managed by discrete programs, which enables improvement of user's convenience in use. In other words, even when scenes recorded with recording devices having different management units are recorded in an optical disk, the recorded contents can be managed accurately without causing troubles for users.

In the video camera 1, the data for determination is set at the recording start time and the recording end time for the M_VOB recorded last among the recording start times and recording end times for the M_VOBs assigned to the management data M_AVFIT related to a moving picture video file. When the recording start time and recording end time for the M_VOB recorded last is within a time zone defined by the recording start time and recording end time based on the determination data, it is determined that the recording device having recorded the scene recorded last is a device managing a plurality of scenes with one program by referring to date of recording for each scene like the video camera 1, and the new scene is additionally recorded in the program relating to the last scene. With this feature, in this embodiment, not only when the recording medium 5 once used in the video camera 1 is simply used in a DVD recorder, but also when a portion of the M_VOB is deleted with an editing device, the new scene is prevented from being managed by the program managing a TV program, and on the contrary, a plurality of scenes recorded with the video camera 1 can be managed by one program, so that the user's convenience in use can be improved. In other words, even when data recorded with recording devices having different management units is recorded in an optical disk, the recorded contents can be managed accurately.

Further as time information is set in the data for determination as described above, in the video camera 1, a type of the recording device having recorded the scene recorded last can easily be determined by comparing the record in the user domain to the record in a domain for the management data, so that the processing steps can easily be carried out with the simple configuration.

(3) Effects of the Embodiment

With the configuration as described above, data for determination changing each time data corresponding to a recording unit from a start of a recording operation until the end of the recording operation is recorded in an optical disk is generated and recorded in the optical disk. By comparing the data for determination recorded in the optical disk to management data for determining a type of the recording device having recorded the scene recorded last and switching a management unit, even when scenes recorded with recording devices having different management units are recorded in an optical disk in succession, the recorded contents can be managed accurately.

Further, as the data for determination is time information concerning the recording unit recorded last in the optical disk, even when scenes recorded with recording devices having different management units respectively are recorded in an optical disk in succession, the recorded contents can be managed accurately.

Further, as the time information indicates the recording start time and recording end time, even when a portion of data corresponding to a recording unit is deleted during a process for editing processing, when scenes recorded with recording devices having different management units respectively are recorded in an optical disk in succession, the recorded contents can accurately be managed.

Further, as the data for determination is assigned to management data and recorded in an optical disk, the data for determination can be assigned to the user domain of the management data. Therefore, even when scenes recorded with recording devices having different management units respectively are recorded in an optical disk in succession, recorded contents can accurately be managed.

(4) Other Embodiments

Description of the embodiment above assumes a case in which data for determination includes information for recording start time as well as for recording end time, but the present invention is not limited to this configuration, and in brief, by generating data for determination based on the management data constituting a criteria for determination together with the determination data so that the data changes each time a recording unit is recorded in an optical disk, the same effects as those achieved in the embodiment can be obtained, and for instance, a header address and an end address of the M_VOB recorded last can also be applicable as data for determination.

Further in the embodiment described above, the management data processing section and the system control section are provided discretely, and a program is updated based on a result of processing by the management data processing section as well as by the system control section, but the present invention is not limited to this configuration, and also the configuration is allowable in which all of the processing steps are executed by the system control section which is a computer capable of controlling operations of this type of recording apparatus. A program used in the computer as described above is not only previously installed, but also may be installed through a network such as the Internet, and also may be installed via a recording medium. As the recording medium as described above, an optical disk as the recording medium 5 is available, and in addition various types of recording media such as an IC card may be used.

Further in the embodiment described above, the present invention is applied to a video camera using an optical disk based on the DVD system, but the present invention is not limited to this configuration, and can be applied to video cameras employing various types of recording media.

Further descriptions of the embodiment above assume a case where video data for a moving picture and audio data corresponding to the video data are recorded. The present invention, however, is not limited to this configuration, and can be applied in a wide range including, for instance, a case where still pictures and moving pictures are recorded in one recording medium.

In the embodiment described above, a date is used as a management unit, but the present invention is not limited to this configuration, and various types of management units such as a number of scenes or time information may be employed.

As described above, with the present invention, data for determination changing each time data corresponding to a recording unit from a start of a recording operation until the end of the recording operation is generated based on management data recorded in a recording medium and is recorded in the recording medium, and by comparing the data for determination recorded in the recording medium to the management data for determining a type of a recording apparatus having recorded the recording unit recorded last and switching the management unit based on a result of this determination, even when scenes recorded with recording devices having different management units are recorded in succession, the recorded contents can be managed accurately.

INDUSTRIAL APPLICABILITY

The present invention relates to a recording apparatus, a recording method for a recording medium, and a program for the recording method for a recording medium. The invention can be applied, for instance, to a video camera using an optical disk based on the DVD system.

The invention claimed is:

1. A recording apparatus capable of generating management data for a management unit so that a system stream with an audio stream and a video stream multiplexed therein can be managed as one recorded unit from a recording start to a recording end corresponding to the recording start and also a plurality of recorded units can be managed as another management unit, and also recording the system stream and management data for the another management unit, the recording apparatus comprising:

generating device generating determination data each time data corresponding to said recorded unit is recorded in the recording medium, said determination data is generated based on the management data and said generating device recording said determination data in the recording medium; and determining device comparing said determination data recorded in the recording medium to the management data recorded in the recording medium for the last recorded unit to determine a type of recording apparatus having recorded the last recorded unit, and switching said management unit according to the determined type of recording apparatus.

2. The recording apparatus according to claim 1, wherein said determination data is time information of said recorded unit recorded last in the recording medium.

3. The recording apparatus according to claim 2, wherein said time information comprises the recording start time and recording end time.

4. The recording apparatus according to claim 1, wherein said determination data is assigned to said management data and is recorded in said recording medium.

5. The recording apparatus according to claim 1, wherein said determination data includes a manufacturer ID of the recording apparatus.

6. A recording method for a recording medium enabling generation of management data for a management unit so that a system stream with an audio stream and a video stream multiplexed therein can be managed as one recorded unit from a recording start to a recording end corresponding to the recording start and a plurality of recorded units can be managed as another management unit, and recording said system stream and said management data for the another management unit in the recording medium, said method comprising the steps of:

generating determination data each time said recorded unit is recorded in said recording medium based on said management data and recording said determination data in said recording medium; and determining a type of recording apparatus having recorded said recorded unit recorded last by comparing said determination data recorded in said recording medium to said management data recorded in said recording medium for the last recorded unit and switching said management unit based on a result of said determination.

7. The method according to claim 6, wherein said determination data includes a manufacturer ID of the recording apparatus.

8. A computer readable recording medium encoded with a program for a recording method for making a computer controlling operation of a recording apparatus execute a prespecified sequence of processing steps, wherein said processing sequence is executed for generating management data for a management unit so that a system stream with an audio stream and a video stream multiplexed therein can be managed as one recorded unit from a recording start to a recording end corresponding to the recording start and also a plurality of recorded units can be managed as another management unit, and also for recording the system stream and management data for the another management unit in the recording medium, said sequence comprising the steps of:

generating determination data each time said recorded unit is recorded in said recording medium based on said management data and recording said determination data in said recording medium; and determining a type of recording apparatus having recorded said recorded unit recorded last by comparing said determination data recorded in said recording medium to said management data recorded in said recording medium for the last recorded unit and switching said management unit based on a result of said determination.

9. The computer readable medium recording according to claim 8, wherein said determination data includes a manufacturer ID of the recording apparatus.

* * * * *